Nov. 8, 1966  A. A. HALACSY  3,284,747
ELECTROMAGNETIC DEVICE INCLUDING INTERLINKED
MAGNETIC FLUX AND ELECTRIC CURRENT LOOPS
Filed Jan. 25, 1963  2 Sheets-Sheet 1

INVENTOR
ANDREW A. HALACSY
BY Blum, Moscovitz,
Friedman, Blum & Kaplan

ATTORNEYS.

Nov. 8, 1966  A. A. HALACSY  3,284,747
ELECTROMAGNETIC DEVICE INCLUDING INTERLINKED
MAGNETIC FLUX AND ELECTRIC CURRENT LOOPS
Filed Jan. 25, 1963  2 Sheets-Sheet 2

INVENTOR
ANDREW A. HALACSY
BY Blum, Moscovitz,
Friedman, Blum & Kaplan
ATTORNEYS.

United States Patent Office 3,284,747
Patented Nov. 8, 1966

3,284,747
ELECTROMAGNETIC DEVICE INCLUDING INTERLINKED MAGNETIC FLUX AND ELECTRIC CURRENT LOOPS
Andrew A. Halacsy, 2429 Laura Lane, Mountain View, Calif.
Filed Jan. 25, 1963, Ser. No. 253,838
5 Claims. (Cl. 336—233)

This invention relates to electromagnetic devices of the type comprising interlinked magnetic flux and electric current loops and, more particularly, to such a device in which both the weight and the losses are very substantially reduced as compared to known electromagnetic devices of this type having the same ratings.

The operation of most electromagnetic devices is based upon the interlinking of two loops, one comprising an electric current loop and the other a magnetic flux loop. More particularly, a loop of an electrically conductive material is interlinked with a loop of magnetic flux carrying material to interlink the electric current loop and the magnetic flux loop. The interlinking of the two loops is in the nature of the interlinking of two chain links.

While the electric current carrying material is usually a metallic wire or tape, it can be any solid, liquid or gaseous material, and may even be a dielectric material. In the latter case, the current in the electric loop is a dielectric current. The material of the magnetic flux loop is usually a paramagnetic material, such as a ferro-magnetic material, for example silicon steel, although the material of the magnetic flux loop can be in any form, even a gas, provided it will carry a magnetic flux. Electromagnetic devices comprising such interlinked loops, particularly interlinked magnetic cores and current-carrying coils, include transformers, reactors, relay coil assemblies, and like devices of this nature.

The electric currents passing through materials develop losses due to the electric resistance of the material. Similarly, magnetic flux flowing through a material develops losses in that material related to the magnetic resistance of the material. The losses in both the electric current loop and the magnetic flux loop are directly proportional to some power of the length of the respective loop, and are inversely proportional to some power of the cross sectional area of the respective loop. This cross sectional area is considered as the cross sectional area of the mean or average length of the respective loop, generally referred to as the mean turn length of the respective loop. Thus, the losses of the respective loop can be reduced by reducing the mean turn length, or by increasing the cross sectional area of the loop, or by adopting both expedients.

In known present devices, with one exception, the cross sectional area of a loop is the same throughout the entire length of a loop turn. A known exception is the yoke of some transformers, wherein that part of the core outside the electric current-carrying loop may have an increased cross sectional area in comparison with that of the leg of the core passing through the current-carrying loop. This increased cross sectional area is provided for the purpose of reducing magnetic induction, with the consequent reduction in the acoustical noise in the yoke, and the increases in cross sectional area are always moderate. More importantly, such increases in cross sectional area have always been effected by increasing that dimension of the loop which is perpendicular to the axis of the loop. Such increase in the dimension of the loop perpendicular to the axis thereof results in an increase in the mean turn length.

In accordance with the present invention, it has been found that both the losses and the weight of interlinked loop type electromagnetic devices may be greatly decreased if, directly contrary to the teachings of the prior art, the cross sectional area of one or both loops is increased by elongating the loop parallel to its axis rather than perpendicular thereto. Such elongation may take place over the entire length of the loop or it may take place over only that portion of the loop which is outside of the other loop, with the cross sectional area of that portion of the loop extending through the other loop being reduced. In the latter case, the cross sectional area of that portion of the loop outside of the interlinked loop may be even further increased to compensate for the reduced cross section for that portion of the loop which passes through the interlinked loop.

By the teachings of the present invention, involving axial elongation of the cross sectional area of one or both loops, the mean turn length of one or both loops is substantially decreased, thus resulting in a substantial decrease in losses which are proportional to the mean turn length of the loop. At the same time, due to the increase in the cross sectional area at least in that portion of the loop outside of the interlinked loop, the losses which are inversely proportional to the cross sectional area of the loop are likewise decreased. An attendant advantage of the arrangement is a reduction in weight of the electromagnetic device for a given rating.

For an understanding of the principles of the invention, reference is made to the following description of typical embodiments thereof as illustrated in the accompanying drawings. In the drawings.

Fundamentally, the present invention may be said to involve an electromagnetic device comprising a first loop of electrically conductive material and a second loop of paramagnetic material, with the loops being interlinked with each loop extending through the other loop substantially axially of the latter and at least one leg of at least one loop having a dimension, parallel to the axis of such one loop, substantially greater than its dimension perpendicular to the axis of such one loop. Stated another way, at least one leg of at least one loop has a dimension perpendicular to the axis of such one loop substantially less than its dimension parallel to the axis of such one loop. In either case, the mean turn length of the loop is substantially reduced for a selected cross sectional area thereof.

While it has been stated that the interlinked loops may be made of any magnetic flux or electric current carrying material, for the purpose of the following description it will be assumed that the magnetic flux carrying loop is formed of a paramagnetic material such as, for example, a ferro-magnetic material, particularly silicon steel. It will further be assumed that the electric current carrying loop is in the form of a wire, a band, or an edge wound bar or strip of copper, aluminium, or other electrically conductive material.

Figure 1:
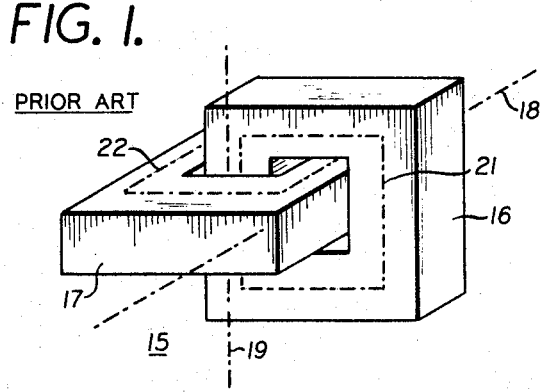
FIG. 1 is a perspective view of a known interlinked loop type of electromagnetic device.

Referring to FIG. 1, a prior art electromagnetic device 15 is illustrated as comprising a magnetic flux loop or yoke 16 which is interlinked with a current carrying loop 17. The axis of loop 16 is indicated at 18, and that of loop 17 is indicated at 19. The mean turn length of loop 16 is indicated at 21 and that of loop 17 is indicated at 22. The electromagnetic device 15 is typical of prior art devices in which the cross sectional area of each loop is maintained uniform throughout its length, although in certain cases the cross sectional area of the magnetic loop may be reduced where it passes through the electric current carrying loop, as mentioned above.

Figure 2:
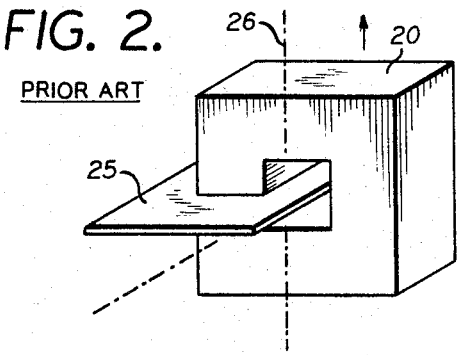
FIG. 2 is a perspective view of an electromagnetic device, similar to that shown in FIG. 1 and also representative of the prior art, this electromagnetic device comprising a magnetic core or loop whose cross-sectional area is increased by elongation in a direction perpendicular to the axis of the magnetic loop, and including a pancake type of electric current carrying coil or loop.
Figure 3:
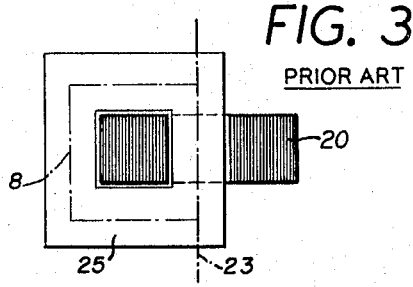
FIG. 3 is a horizontal sectional view of the electromagnetic device shown in FIG. 2.
Figure 4:
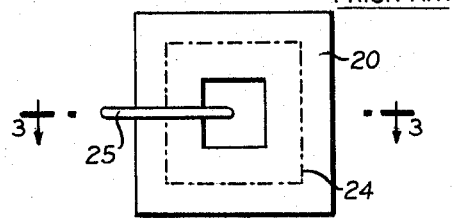
FIG. 4 is a front elevational view thereof.

FIGS. 2, 3 and 4 illustrate an electromagnetic device in which, in accordance with the prior art teaching, the cross sectional areas of the loops may be increased by increasing that dimension of each loop which is perpendicular to the axis of the loop. In FIGS. 2, 3 and 4, the magnetic flux loop is a laminated rectangular core 20, which can have its cross sectional dimension perpendicular to the loop axis 23 increased to increase the cross sectional area. The electrical loop 25 can have its cross sectional area increased, in a direction perpendicular to the loop axis 26, by utilizing an edge wound copper strip or bar. The axis of loop 20 is indicated at 23, and the axis of loop 25 is indicated at 26. The mean turn length of loop 20 is illustrated by a dot and dash line in FIG. 4, and is designated 24 and the mean turn length of loop 25 is shown by line 8 in FIG. 3.

Figure 5:
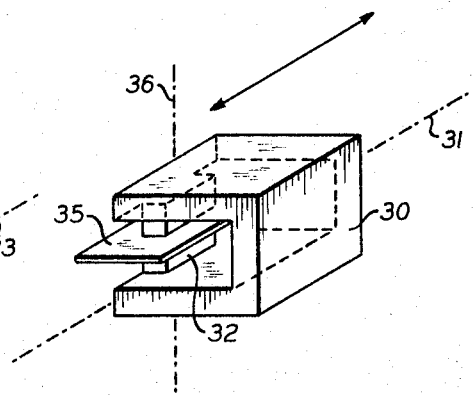
FIG. 5 is a perspective view of an electromagnetic device embodying the invention and having loop cross-sectional areas equal to those of the electromagnetic device of FIG. 2.
Figure 6:
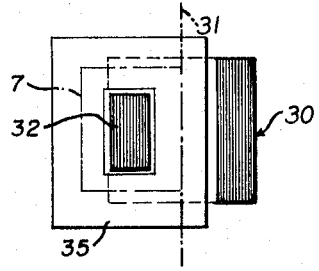
FIGS. 6 and 7 are views, respectively corresponding to FIGS. 3 and 4 but related to FIG. 5.
Figure 7:
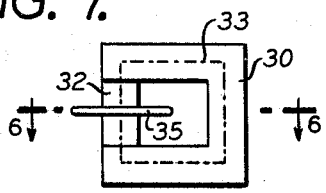

For contrast, FIGS. 5, 6 and 7 illustrate an electromagnetic device in accordance with the invention and in which the cross sectional areas of the respective loops are equal to the cross sectional areas of the respective loops of the electromagnetic device shown in FIGS. 2, 3 and 4. However, in FIGS. 5, 6 and 7, the magnetic flux carrying loop 30 is illustrated as having its cross sectional area increased by increasing that transverse dimension of the loop which is parallel to the axis 31 of the loop, and correspondingly decreasing that transverse dimension of the loop which is perpendicular to the axis 31.

The electromagnetic device shown in FIGS. 5, 6 and 7 includes a current carrying loop 35 which is formed by edgewise winding of a copper bar and strip. The leg 32 of the magnetic flux loop 30, which passes through the opening in current carrying loop 35, is reduced in cross sectional area as compared to the remainder of magnetic loop or core 30. The axis of current carrying loop 35 is indicated at 36, and the mean turn length of magnetic flux loop 30 is indicated at 33 in FIG. 7 while the mean turn length of loop 35 is indicated in FIG. 6 by line 7.

A comparison of two loops of the same cross sectional area will show that the loop which has its cross section elongated in the direction of its axis and reduced in the direction perpendicular to its axis has a mean turn length less than that of a loop which is essentially square or which may have its cross sectional area increased in the direction perpendicular to the axis and reduced in a direction parallel to the axis. From this, it may also be shown that the loop having its cross sectional area increased in a direction parallel to its axis will have a volume smaller than that of the comparative loop, as the volume of a loop is equal to the cross sectional area multiplied by the mean turn length. It further follows that the losses in the loop having its cross sectional area increased in a direction parallel to its axis can be shown to be smaller than the losses in the comparative loop if the cross sectional areas of the two loops are maintained equal throughout the entire mean turn length.

This is true even if the cross sectional area throughout the entire mean turn length is not kept the same but is reduced in that portion of the loop which passes through the opening in the other loop, and is expanded to a cross sectional area larger than that of the comparative loop in that portion of the axially expanded loop outside the opening in the other loop. The weight and the losses of the loop having its cross sectional area increased in the direction parallel to its axis is less than the weight and the losses of the comparative loop. Furthermore, the weight and, correspondingly, the losses, of a loop interlinked with a loop having its cross sectional area increased in a direction parallel to its axis are also decreased, so that the total decrease in the weights and losses is cumulative for the entire electromagnetic device.

The foregoing can be illustrated by a comparison of the electromagnetic device shown in FIGS. 2, 3 and 4 with that shown in FIGS. 5, 6 and 7. For example, the magnetic flux loop 20 of the device shown in FIGS. 2, 3 and 4 may have a cross sectional area which is one inch on each side, or one square inch. Its outside length along each side is three inches, and the dimension of the opening therein is one inch by one inch, or one inch square. The electrical loop 25 of FIGS. 2, 3 and 4 has an outside length of two inches, and an inside length of one inch, along each side, thus fitting closely over the magnetic loop 20.

From these figures, it will be noted that the mean turn length of the magnetic flux loop 20 is $4 \times 2'' = 8''$. Its volume is equal to its mean turn length multiplied by its cross sectional area. As the cross sectional area is 1 square inch, the volume of the loop 20 is 8 cubic inches. The weight of the loop is in direct ratio with its volume.

If a core material is selected whose losses are in a direct ratio with the square of the flux density, which is true with good approximation for most magnetic core materials used at the present, the losses in the magnetic flux core may be expressed as follows, where F is the magnetic flux, D the density, FD the flux density, V the volume, K a constant, A the cross sectional area, and L the mean turn length:

$$\text{Loss} = FD^2 \times K \times V$$
$$= FD^2 \times K \times A \times L$$
as $FD = F/A$
$$\text{Loss} = F^2 \times K \times L/A$$

Using the dimensions of loop 20, its
$$\text{Loss} = KF^2 \times 8/1 = 8KF^2$$

The magnetic flux core 30 of FIGS. 5, 6 and 7, has the dimension of its leg 32, parallel to its axis 31, increased to 1.1 inches and the dimension of leg 32, perpendicular to axis 31, decreased to 0.6 inch. The other three sides of the core 30, which sides are outside of the interlinked loop 35, have a transverse dimension, perpendicular to the axis 31, of 0.6 inch, and an axial length of 1.66 inches. The dimension of the opening through the core 30 is 1″ x 1″, or 1 square inch.

The leg 32 of core 30 has a cross sectional area of 0.66″ x 1.1″ or 0.66 square inch, and the cross sectional area of the remainder of core 30 is 0.6″ x 1.66″ or 1 square inch. The weight of loop 30 is directly proportional to its volume, and this volume is composed of two parts. One of these parts constitutes the volume of the leg 32 and the other part constitutes the volume of the remainder of loop 30. The length of leg 32 is 1″ and its cross sectional area is 0.66″ so that the volume of leg 30 is 0.66 cubic inch. The mean turn length of that portion of loop 30 exclusive of leg 32 is equal to 3 × 1.6″, which equals 4.8″, plus 2 × 0.3″, which equals 0.6″, or a total of 5.4″. As the area of that portion of the loop 30 exclusive of leg 32 is equal to 1 square inch, the volume is accordingly 5.4 cubic inches. The total volume of loop 30 is thus 0.66 cubic inch plus 5.4 cubic inches, or 6.06 cubic inches.

The losses of loop 30 are equal to the sum of the loss in leg 32 and the loss in that remainder of loop 30. Using the above formula, $$\text{Loss} = KF^2 \times L/A$$
$$= KF^2(1/0.66 + 5.4/1)$$
$$= KF^2 \times (1.51 + 5.4)$$
$$= 6.91 KF^2$$

From the foregoing, it will be noted that the weight of loop 30 is 24 percent less than the weight of loop 20, and that the losses in loop 30 are 13 percent less than the losses in loop 20. Furthermore, the mean turn length of coil 35 is less than the mean turn length of coil 25. The cross sectional dimension of each of these loops, in a direction perpendicular to the axis thereof, is 1″. Accordingly, the mean turn length of each loop 25 or 35 is equal to the sum of its internal periphery plus 8×0.5″, representing half the cross sectional dimension in a direction perpendicular to the loop axis. Thus, the mean turn length of the loop 25 is 4 × 2.0″ or 8″. The mean turn length of the loop 35, on the other hand, is equal to 2 × 1.6″ plus 2 × 2.1″, or 3.2″+4.2″, which is equal to 7.4″. It will thus be seen that the mean turn length of the loop 35 is only 92.5 percent of the mean turn length of the loop 25. As the losses in either of the electric current carrying coils 25 or 35 are directly proportional to the mean turn length thereof, the losses in the loop 35 are thus only 92.5 percent of the losses in the loop 25, for equal cross sectional areas of the loops.

Figure 8:
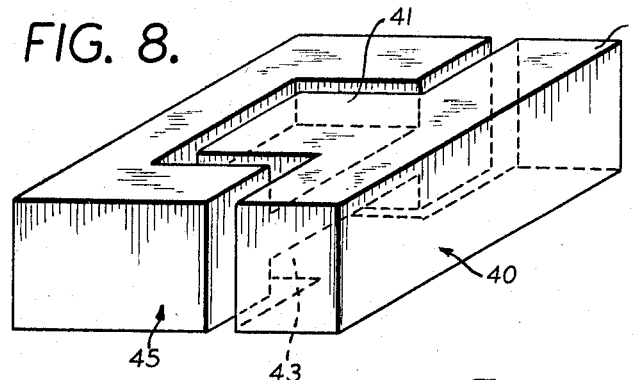
FIG. 8 is a perspective view of another form of electromagnetic device embodying the invention.
Figure 9:
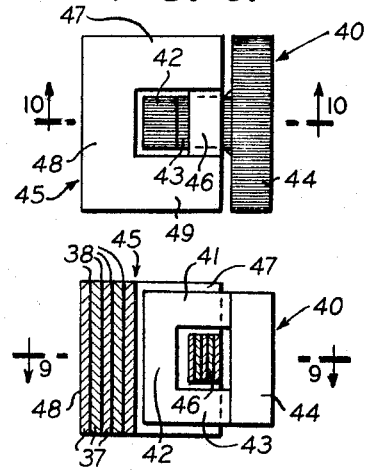
FIG. 9 is a horizontal sectional view of the electromagnetic device shown in FIG. 8, taken on the line 9—9 of FIG. 10.
Figure 10:
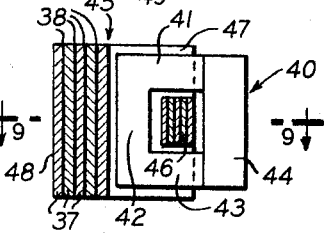
FIG. 10 is a sectional view of the electromagnetic device shown in FIGS. 8 and 9, taken on the line 10—10 of FIG. 9.

FIGS. 8, 9 and 10 illustrate an alternative embodiment of an electromagnetic device in accordance with the invention, and based upon the same principles as the device of FIGS. 5, 6 and 7. Referring to FIGS. 8, 9 and 10, in this form of the invention, a magnetic flux carrying loop 40 is interlinked with an electric current carrying loop 45.

Loop 40 may comprise stacked steel sheets, such as silicon steel sheets commonly used in the transformer art. A lesser number of these silicon sheets is used to form the three legs 41, 42 and 43 of the loop 40 which embrace a leg of the loop 45, than is used in forming the leg 44 which is completely outside of the loop 45. Thus, the leg 44 has its dimension, in a direction parallel to the axis of loop 40, very substantially increased by using more silicon steel sheets to form this leg than are used to form the legs 41, 42 and 43.

Electric current carrying loop 45 is a coil wound of electrically conductive strip material, such as copper or aluminium foil, with successive layers 37 of the electrically conductive material being electrically insulated from each other in any suitable manner as, for example, by varnished cloth 38. However, the successive layers of conductive material 37 may be electrically insulated from each other in any other suitable manner known to those skilled in the art of winding electrical coils.

The leg 46 of loop 45, which passes through the opening in loop 40, has a smaller length, axially of loop 40, than do the legs 47, 48 and 49 disposed outside the opening of loop 40. Legs 47, 48 and 49 have their cross section very substantially increased by increasing that transverse dimension which extends parallel to the axis of the coil 45. As will be apparent from the discussion in connection with FIGS. 2 through 7, the mean turn lengths of both loops 40 and 45 are substantially reduced as compared to those of loops having an equivalent cross sectional area but in which the cross sectional area is increased in a direction perpendicular to the loop axis rather than parallel thereto. Consequently, the volume, weight, and losses of the loops 40 and 45 are very substantially decreased as compared to similar loops not embodying the present invention.

Figure 11:
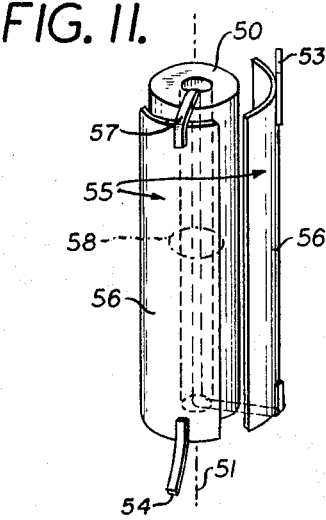
FIG. 11 is a perspective view of a further form of electromagnetic device embodying the invention.

FIG. 11 illustrates another embodiment of the invention in which the electromagnetic device includes a magnetic flux loop 50 which is substantially cylindrical and very substantially elongated parallel to its axis 51. It will be noted that the transverse dimension of the cross sectional area of the loop 50 is substantially decreased in a direction perpendicular to its axis, or radially of the coil.

Loop 50 is interlinked with a current carrying loop 55, only two turns of which are shown. Each turn 55 includes a relatively thin arcuate strip 56 which has a length equal to a little more than the axial length of the loop 50, and a relatively narrow strip 57 which is electrically connected at each end to the strip 56 and extends through the opening in the loop 50. The "axis" of the loop 55 is indicated by the broken line circle 58, and it will be noted that the loop 55 is greatly elongated in the direction parallel to its "axis," or circumferentially of the axis of loop 50, and has a very substantially reduced dimension perpendicular to its "axis" or radially of the loop 50. The loop 50 may be constructed in any suitable manner common to the art of transformer cores, and the loop 55 may comprise any suitable electrically conductive material. Current carrying loops 55 are shown connected in series as an example of one possible connection. It is understood, however, that loops 55 may be connected in parallel or not at all as in the case of a multiwinding transformer. FIG. 11 illustrates loops 55 connected in a two turn configuration having end terminals 53 and 54 connected at the ends of arcuate strips 56.

Figure 12:
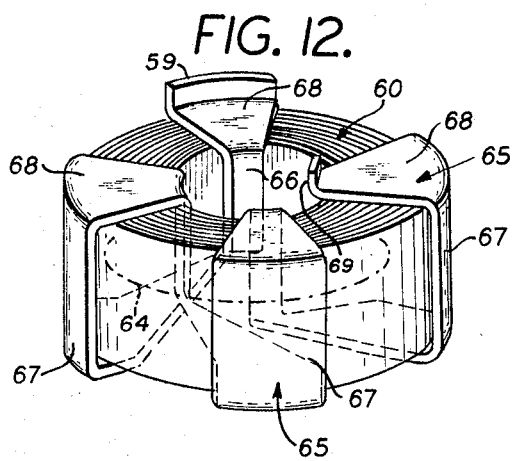
FIG. 12 is a perspective view of still another form of electromagnetic device embodying the invention.

FIG. 12 illustrates another embodiment of the invention is which the electromagnetic device includes a magnetic flux loop 60 and an electric loop 65. Magnetic flux loop 60 is a conventional toroidal core wound of a silicon steel tape and of uniform dimensions throughout its length. It will be noted that the core is elongated somewhat in an axial direction or parallel to its axis, and is reduced somewhat in a radial direction or perpendicular to its axis.

The turns of the electric current loop 65 may be formed of any suitable electrically conductive material and include legs 66 of relatively reduced cross sectional area which extend through the opening in the core 60. Each of the turns of the loop 65 includes an outer leg 67 which has an arcuate extent very greatly increased over that of the inner leg 66, and legs 67 are joined to legs 66 by sector shaped transition legs 68 which overlie opposite ends of the magnetic flux core 60. The "axis" 64 of the loop 65 is indicated in broken lines as a circle, and it will be noted that each of the turns of the loop 65 is greatly extended in an "axial" direction or parallel to the "axis" 64, and reduced in dimension in a direction perpendicular to the "axis" 64. It will be noted that that dimension of each turn of loop 65 parallel to the axis 64 increases progressively from the inner leg 66 thereof to the outer leg 67 thereof. Current carrying loops 65 are shown connected in series and having end terminals 59 and 69 connected at legs 68. It is understood, however, that loops 65 may alternatively be connected in parallel or not at all as in the case of a multiwinding transformer.

Figure 13:
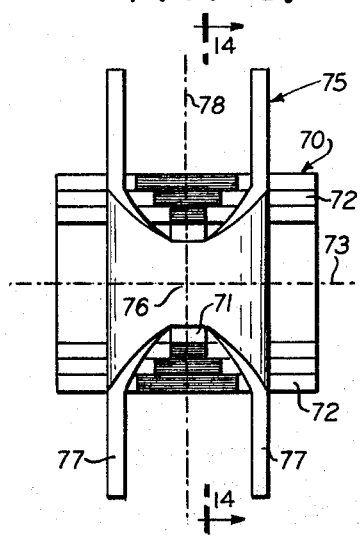
FIG. 13 is a sectional view, taken on the line 13—13 of FIG. 14, illustrating a further embodiment of electromagnetic device in accordance with the invention.
Figure 14:
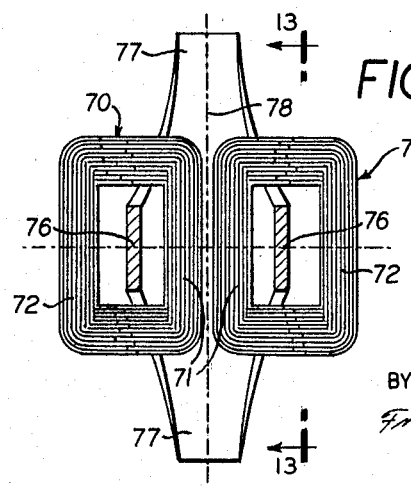
FIG. 14 is a sectional view of the electromagnetic device shown in FIG. 13, taken on the line 14—14 of FIG. 13.

In the embodiment of the invention shown in FIGS. 13 and 14, the electromagnetic device includes a pair of magnetic flux carrying loops 70 and an electric current carrying loop 75. The loop 75 comprises a coil wound of a tape of electrically conductive material, such as copper or aluminium, and its dimension parallel to its axis is progressively increased to a relatively large value from the portion 76 of the loops which pass through the magnetic flux loops 70 to the legs 77 which are entirely outside the magnetic loops 70. The axis of loop 75 is indicated at 78. The dimension of loop 75 perpendicular to its axis 78 remains unchanged throughout the length of the loop, and is reduced relative to an electric current carrying loop according to the prior art and having the same cross sectional area.

The magnetic loops or cores 70 are stacks of curved sheets of silicon steel. Each loop includes a set of narrow sheets 71 which extend through the opening of the loop 75, and sets of sheets 72 which are outside the opening of loop 75. The sets of sheet 72 are extended substantially in a direction parallel to the axis 73 of the respective loop 70, whereas each set of sheets 71 has a dimension, parallel to the axis 73, which is relatively small.

In accordance with the invention, the sheets forming the inner legs 71 may comprise sheets of grain oriented cold rolled silicon steel which has lower losses per cubic inch than the sheets forming the outer legs 72 outwardly of the opening in the coil 75. The sheets 72, which are outwardly of the opening in the coil 75, and which are elongated parallel to the axis 73 of the loop 70, may be made of hot rolled silicon steel which has higher losses per cubic inch.

FIGS. 13 and 14 illustrate the principle that it is not necessary that the same materials be used throughout the entire mean turn length of a loop embodying the invention. Thus, and in accordance with the invention, materials having lower losses per cubic inch can be used with great advantage along the mean turn length where the cross sectional area is comparatively small, and materials with higher losses per cubic inch can be applied along the mean turn length where the cross sectional area is large. One advantage of this is that materials with lower losses are usually more expensive than materials with higher losses, and using different materials in a single loop, in accordance with the invention, reduces the overall cost of the electromagnetic device.

Use of different materials along the length of each loop can also result in a reduction in the weight of the device. For example, in the electric current carrying loop, aluminium can be used in those portions of the loop which are outside the opening through the magnetic flux loop, and copper can be used for those portions of the electric current loop which extend through the opening in the magnetic flux loop. This will result in a substantial reduction in the overall weight of the electric current loop.

Furthermore, and by reference to FIGS. 13 and 14, it will be apparent that the invention is not restricted to electromagnetic devices comprising only a single pair of interlinked loops. For example, FIGS. 13 and 14 illustrate an electromagnetic device in which there is more than one magnetic flux carrying loop, and FIGS. 11 and 12 illustrate an electromagnetic device in which there can be more than one electric current carrying loop, and in which the various loops may be supplied with different currents from different sources.

While a specific embodiment of the invention has been shown and described in detail to illustrate the applications of the principles of the invention, it will be understood that the invention may be embodied otherwise without departing from such principles.

What is claimed is:

1. An electromagnetic device comprising a first loop of electrically conductive material; and a second loop of paramagnetic material, said loops being interlinked with each loop extending through the other loop substantially axially of the latter; at least one leg of at least one loop having a dimension, perpendicular to the axis of such one loop, substantially less than its dimension parallel to the axis of such one loop; whereby the mean turn length of said loop is substantially reduced for a selected cross sectional area thereof; that portion of said one loop extending through the other loop having a dimension, parallel to the axis of such one loop, substantially less than the dimension, parallel to the axis of such one loop of said one leg, and that portion of said one loop extending through the other loop comprising material having a low hysteretic constant and a resistivity substantially lower than the material comprising the remainder of said one loop.

2. An electromagnetic device, as claimed in claim 1, in which said one loop is the electrically conductive loop, that portion of the electrical loop extending through the paramagnetic loop comprising copper, and that portion of the electrical loop outside the paramagnetic loop comprising aluminium.

3. An electromagnetic device as claimed in claim 1, in which said one loop is the paramagnetic material loop, that portion of said paramagnetic loop extending through the electrically conductive loop comprising sheets of grain oriented cold rolled silicon steel, and that portion of said paramagnetic loop outside the electrically conductive loop comprising sheets of hot rolled silicon steel.

4. An electromagnetic device comprising a first loop of electrically conductive material; a second loop of paramagnetic material, said loops being interlinked, with each loop extending through the other loop substantially axially of the latter; at least one leg of each loop outside of the other loop having a dimension, perpendicular to the axis of the associated loop, substantially less than its dimension parallel to the axis of its respective loops including at least one additional loop of paramagnetic material interlinked with said first loop with one leg of said additional loop extending through the first loop substantially parallel to the axis thereof; the portion of each magnetic loop outside said first loop having a dimension, perpendicular to the axis of its respective paramagnetic loop, substantially less than its dimension parallel to the axis of its respective paramagnetic loop whereby the mean turn lengths of said loops are substantially reduced for selected cross sectional areas thereof.

5. An electromagnetic device as claimed in claim 4, the portion of said electrically conductive loop outside of the paramagnetic loops having a dimension, perpendicular to the axis of said electrically conductive loop, substantially less than its dimension parallel to the axis of such electrically conductive loop; each of said paramagnetic loops comprising stacked sheets of paramagnetic material arranged in superposed multi-sheet sections superposed radially of the respective paramagnetic material loop; the portions of each section extending through said electrically conductive loop being substantially reduced in cross-sectional area relative to the portions of each section exterior to said electrically conductive loop; the portions of each section of each paramagnetic material loop external to said electrically conductive loop having a dimension, parallel to the axis of the respective paramagnetic material loop, which is a large multiple of the dimension perpendicular to the axis of the respective paramagnetic loop whereby the mean turn lengths of said loops are substantially reduced for selected cross sectional areas thereof.

References Cited by the Examiner

UNITED STATES PATENTS

| | | | |
|---|---|---|---|
| 2,709,791 | 5/1955 | Anderson | 336—82 X |
| 2,955,246 | 10/1960 | Reaves | 336—221 X |
| 3,069,642 | 12/1962 | Lekens | 336—234 X |

LEWIS H. MYERS, *Primary Examiner.*

JOHN F. BURNS, *Examiner.*

T. J. KOZMA, *Assistant Examiner.*